United States Patent [19]

Hönig et al.

[11] Patent Number: 4,968,730

[45] Date of Patent: Nov. 6, 1990

[54] PROCESS FOR THE PREPARATION OF PIGMENT PASTE RESINS FOR CATHODICALLY DEPOSITABLE COATING COMPOSITIONS HAVING QUATERNIZED OXAZOLIDINE FUNCTIONAL GROUPS

[75] Inventors: Helmut Hönig; Georg Pampouchidis; Herbert Matzer, all of Graz, Austria

[73] Assignee: Vianova Kunstharz, A.G., Werndorf, Austria

[21] Appl. No.: 410,268

[22] Filed: Sep. 21, 1989

[30] Foreign Application Priority Data

Sep. 21, 1988 [AT] Austria ................................. 2308/88

[51] Int. Cl.$^5$ ...................... C08G 59/14; C08L 63/00
[52] U.S. Cl. ..................... 523/404; 523/414; 523/417; 523/420; 528/103; 528/107; 528/117
[58] Field of Search ............... 523/404, 414, 417, 420; 528/103, 107

[56] References Cited

U.S. PATENT DOCUMENTS 4,550,146 10/1985 Paar et al. ........................... 523/414
4,837,291 6/1989 Paar ..................................... 523/415

*Primary Examiner*—Earl Nielsen
*Assistant Examiner*—Frederick Krass
*Attorney, Agent, or Firm*—A. W. Breiner

[57] ABSTRACT

Preparation of pigment paste resins for cathodically depositable coating compositions based on epoxy resin-amine adducts obtained from unmodified or modified epoxy resins, which by partial or complete reaction of secondary amino groups with formaldehyde contain oxazolidine structures; whose tertiary amino groups introduced via primary-tertiary diamines are quaternized to at least 20 mol % using an organic acid and a monoglycidyl compound and which in a solution adjusted with water to a correct application viscosity contain a total of 80 to 100 millimoles of acid per 100 g of solid resin are described. The pigment pastes possess, both in concentrated and dilute form, a stability which meets practical requirements and, because of their rheology, are readily processed to ensure formation of defect-free films both during deposition and crosslinking by stoving. The applied films have good properties.

13 Claims, No Drawings

PROCESS FOR THE PREPARATION OF PIGMENT PASTE RESINS FOR CATHODICALLY DEPOSITABLE COATING COMPOSITIONS HAVING QUATERNIZED OXAZOLIDINE FUNCTIONAL GROUPS

FIELD OF INVENTION

This invention relates to the preparation of pigment paste resins. More particularly, the invention relates to a process for the preparation of modified epoxy resins which can be used as pigment paste resins for cathodically depositable coating compositions, and to the modified epoxy resins of the process.

BACKGROUND OF INVENTION

Pigment paste resins are an important component of cathodically depositable coating compositions and exert substantial influence on the bath parameters and on physical and chemical characteristics of the paint films.

Pigment paste resins based on epoxy resins have been referred to in the patent literature over a long period of time. Thus, U.S. Pat. Nos. 3,936,405 and 4,035,275 disclose cationic, water-thinnable polymers which are obtained by the reaction of polymers containing 1,2-epoxide groups, especially of polyglycol-modified epoxy resins, with amine salts, phosphine-acid or sulphide-acid mixtures giving rise to onium groups. Similar products which are cross-linked by transurethanization are disclosed in DE-PS 2,634,211 C2; DE-OS 2,634,229 A1, or DE-OS 2,928,769 A1.

Pigment wetting of resins crosslinkable by transesterification can be enhanced by the introduction of quaternary ammonium groups in the resins, making their use as pigment grinding resins possible. This variant is disclosed, for example, in DE-OS 3,322,781 A1. To improve the stability of these pigment pastes, DE-OS 3,622,710 A1 suggests formation of quaternary ammonium groups in the presence of the pigment powder. Pigment paste resins which yield coatings with improved corrosion resistance are obtained, according to EP 107,088 A1, by reacting monoepoxides, such as alkylene oxides, glycidyl esters, or glycidyl ethers with long-chain tertiary amines in the presence of an acid and/or water with the formation of quaternary ammonium groups. According to EP 107,098 A1, higher pigment loading is possible if these systems additionally contain amide groups. According to EP 107,089 B1, polyepoxides can be reacted in the same manner, making it possible to use higher proportions of pigments. Pigment paste resins based on alkylphenol-modified epoxy resins containing sulphonium groups, such as those disclosed in EP 251,772 A2, are alleged to permit formation of thicker films. In another type of a pigment paste resin disclosed in EP 199,473 A1, an epoxidized polybutadiene is reacted with a secondary amine. The addition of an acid and a monoepoxide leads to the introduction of quaternary ammonium groups.

Pigment paste resins based on epoxy resins comprising oxazolidine groups are disclosed, for example, in AT-PS 365,214 and AT-PS 380,264. Resins of this type exhibit good general characteristics necessary for pigment paste resins, and have found use in practice despite drawbacks connected with their dispersibility in the bath material.

The voluminous literature relating to the formulation of pigment pastes for cathodically depositable coating compositions emphasizes that there is a problem in this field for which there is still no completely satisfactory solution despite research extending over a number of years and despite numerous suggestions for solving the problem.

SUMMARY OF INVENTION

It has now been found that by careful modification to, and balancing of such modifications to bisphenol A-epoxy resins it is possible to arrive at an optimum compliance with the various requirements for pigment paste resins for cathodically depositable compositions. The present invention, therefore, relates to a process for the preparation of pigment paste resins based on modified epoxy resins for cathodically depositable coating compositions, characterized in that:

(A) an unmodified or modified epoxy resin which posesses at least one epoxide group, preferably two epoxide groups, and a glass transition temperature between 10 C and 40.C, preferably between 20.C and 35°C., is reacted with (B) 50 to 100 mol %, based on the free epoxide groups in (A), of a primary-tertiary diamine, preferably an N,N-dialkylaminoalkylamine, and (C) if desired, the remaining free epoxide groups are reacted with a primary or secondary amine either at the same time or subsequently, (D) the reaction product is reacted with 80 to 100 mol %, based on the total of the primary amino groups of the amines used in (B) and (C), of formaldehyde with the formation of oxazolidine structures, (E) at least 20 mol % of the tertiary amino groups of the diamine (B) are quaternized using an organic acid, preferably formic acid, and a monoglycidyl compound in the presence of water, and (F) the amount of the acid used in (E) is made up to 80–100 millimoles per 100 g of solid resin and the product is adjusted with water to a correct application viscosity, with the proviso that the degree of quaternization is chosen in order that a solution of the product obtained in stage (E), containing 45% by weight of monoethylene glycol monobutyl ether and, in addition, a maximum of 5% by weight of other organic solvents, is miscible at room temperature with water in any proportion to give a clear solution.

The invention further relates to pigment paste resins based on epoxy resin-amine adducts obtained from unmodified or modified epoxy resins, which by partial or complete reaction of secondary amino groups with formaldehyde contain oxazolidine structures, whose tertiary amino groups introduced via primary-tertiary diamines are quaternized to at least 20 mol % using an organic acid and a monoglycidyl compound, and which in a solution adjusted with water to a correct application viscosity contain a total of 80 to 100 millimole of acid per 100 g of solid resin.

The products prepared according to the invention produce pigment pastes which conform to the various requirements found in practice, even with a varying composition of the pigments used. The products possess, both in concentrated and dilute form, a stability which meets practical requirements and, because of their rheology, are readily processed to ensure formation of defect-free films both in deposition and in crosslinking, and do not negatively affect the properties of the applied films.

The epoxy resins employed possess, on average, at least one epoxide group, preferably two epoxide groups, and a glass transition temperature between 10.C and 40 C, preferably between 20°C. and 35°C., the glass transition temperature being of considerable significance for the characteristics of the end product. As a rough guide, the required range is reached when this component consists of 40% to 80% by weight of aromatic molecular building blocks and 60% to 20% by weight of aliphatic molecular building blocks. Such products are commercially available, but they can be obtained in a simple and known manner by modifying epoxy resins based on polyphenols. The preferred starting materials for modification are the diglycidyl ethers of bisphenol A, having an epoxide equivalent weight between approximately 200 and 1000. The aliphatic part required for the desired glass transition temperature can be introduced via a modification using polyglycidyl ethers of aliphatic compounds such as (poly)glycols or aliphatic carboxylic acids, or via a linking of the epoxy resins by aliphatic and/or aromatic bridges. Examples of such modifications are:

Linking of bisphenol-epoxy resins with secondary diamines, e.g., a reaction product of from 2 mol and 3 mol, respectively, of a monoglycidyl ester or monoglycidyl ether and 1 mol of hexanediamine or bishexanetriamine;

Linking of bisphenol-epoxy resins by polyether diols, such as alkoxylated diphenols, and polyester diols, such as polycaprolactone diols. Other co-reactants for linking are dicarboxylic acids, such as adipic acid or dimeric fatty acids. Good results are also obtained when (poly)disulphides are used as the linking agent; and Linking of a bisphenol A-diepoxide compound with an aliphatic diepoxide based on a polyglycol by an aromatic bridge, for example bisphenol A.

If desired, a defunctionalization of a part of the epoxide groups can be carried out for example by using monophenols such as octylphenol or nonylphenol. The modifications above set forth as well as other modifications of this type are carried out using known processes.

50 to 100 mol % of the free epoxide groups of the unmodified or modified epoxy resins are reacted with a primary-tertiary diamine, preferably in the presence of an inert solvent. The preferred diamines for this purpose are N,N-dialkylaminoalkylamines, such as dimethylaminoethylamine or homologous compounds. Water-soluble or at least watertolerating solvents which do not affect the reactions when the preparation is carried out under the conditions stated are used as organic solvents. Examples of these solvents are the glycol monoethers and glycol diethers or methyl isobutyl ketone. At least the test reactions for establishing the degree of quaternization are preferably carried out in the presence of monoethylene glycol monobutyl ether. Any remaining epoxide groups are reacted with primary or secondary amines, especially with alkylamines and/or alkanolamines. For this purpose the primary amines are preferably used in such amounts that one mol of the amine is employed per epoxide group. The resultant secondary amino groups can be used in the next reaction stage, i.e., in the formation of oxazolidine rings. The reaction with the diamines is preferably carried out at the same time as the reaction with the monoamines.

The secondary β-hydroxyalkylamino compounds formed in the amine reaction are reacted in the next reaction stage with 80 to 100 mol % of formaldehyde with the formation of oxazolidine structures, one mol of water of reaction being in each case liberated per mol of formaldehyde used. The water of reaction is removed from the reaction mixture by azeotropic distillation with the aid of an entraining or removal agent, for example methyl isobutyl ketone.

A partial quaternization of the tertiary amino groups of the product is carried out in the last modification stage. At least 20 mol % of the tertiary amino groups introduced by the primary-tertiary diamine are reacted with an organic acid and a monoglycidyl compound in the presence of water. The optimum proportion of quaternary groups is obtained when a solution of the quaternized product which contains 45% by weight of monoethylene glycol monobutyl ether in addition to a maximum of 5% of other organic solvents, is miscible at room temperature with water in any proportion. The degree of quaternization is preferably not significantly higher than is required for complete compliance with the stated solubility conditions. This optimum degree of quaternization is preferably established by a test reaction using the appropriate amount of the test solvent.

In the last stage of the process the product is treated with enough organic acid for the total amount of acid, i.e., including the acid used for the quaternization, to be 80 to preferably 100 millimoles per 100 g of solid resin. The acid used in this stage, as well as for the quaternization, is formic acid, acetic acid, or lactic acid. Formic acid is preferably used for both process stages. In general it has been established that when smaller amounts of acid are used the solubility of the paste resin can be improved, but the optimum stability characteristics are not reached and pigment wetting is impaired.

The products, preferably after adjustment to the desired or correct application viscosity with water, are used to prepare pigment pastes for cathodically depositable coating compositions. In addition to the pigments, the pastes may contain the customary additives such as wetting agents, antifoams, and others.

The formulation of the pigment pastes and the choice and methods for grinding the pigments are known to those skilled in the art from the literature. The final formulation of the pigment paste to a bath material, or to a replenishing component, is likewise carried out according to known processes. Known products may be used as the principal binders of a paint formulation. The proportion of the paste resin may be between 5% and 50% by weight of the total resin in the composition. The methods for electrocoating are likewise known to one skilled in the art.

The example below illustrates the invention without limiting its scope. All parts and percentages are by weight, unless otherwise indicated.

EXAMPLE (a) In a suitable reaction vessel 215 parts of bishexamethylenetriamine (1 mol) are heated to 90°C. and 558 parts of 2-ethylhexyl glycidyl ether (3 mol) are added at a constant rate in the course of one hour, the temperature being raised during the addition to 130 °C. At the end of the addition the temperature is maintained for a further period of one hour.

(b) In another reaction vessel 1900 parts of a bisphenol A-epichlorohydrin epoxy resin (epoxide equivalent 475) are dissolved at 50.C to 60.C in 2454.5 parts monoethylene glycol monobutyl ether. 773 parts of the component prepared in (a) above are added, and the reaction is allowed to proceed for one hour at 120° C. The intermediate thus obtained has an average glass transition temperature of about 30 C. After cooling to 70°C, 204 parts of dimethylaminopropylamine (2 mol) are added. After the reaction is continued for an additional two hours at 70°C. –80 °C., 66 parts of paraformaldehyde (91%, 2 mol) are added. The temperature is raised to 120°C. –140°C., and the resultant water of the reaction is separated off azeotropically with the aid of methyl isobutyl ketone as a water-removal agent. As soon as about 36 parts of water of reaction have formed, 290.7 ml of 5N formic acid (equal to 50 millimoles of acid per 100 g of solid resin), 93 parts of 2 ethylhexyl glycidyl ether (0.5 mol), and 317 parts of water are added to the product at 70°C. and the temperature is maintained for one hour.

The quaternized product is present in a 49.5% solution and is thinnable with water at room temperature in any proportion. (The solution contains 45% of monoethylene glycol monobutyl ether.) 290.7 ml of 5N formic acid are then added, and the binder is diluted with water to a solids content of 14%.

Preparation And Testing Of A Pigment Paste

A pigment paste is prepared in a laboratory sand mill using the following formulation:

| | |
|---|---|
| 1428.5 | parts of the 14% binder from the Example |
| 30 | parts of carbon black |
| 225 | parts of aluminum silicate pigment |
| 840 | parts of titanium dioxide |
| 105 | parts of lead silicate pigment |
| 2628.5 | parts of finished pigment paste |

The formulation has a viscosity of about 20 seconds (DIN 53211/20° C). The pigment paste remains virtually unchanged after storage at 50.C for one week.

Preparation Of The Binder Dispersion

The binder for the binder dispersion used for the electrocoating paint is prepared on the basis of a modified epoxy resin as follows:

(A) Preparation Of Component A—In a reaction vessel provided with a stirrer, thermometer, dropping funnel and reflux condenser, 1000 g of an epoxy resin based on bisphenol A and epichlorohydrin (epoxide equivalent about 500) is dissolved in 500 g of methyl isobutyl ketone (MIBK) at 60°C.–70°C., and 0.2 g of hydroquinone and 168 g of methacrylic acid are added. The temperature is raised to 100°C–120°C., and the reaction is allowed to proceed at this temperature to an acid value of less than 3 mg of KOH/g. 650 g of BMI (70% solution in MIBK of a basic monoisocyanate, prepared from 1 mol of toluylene diisocyanate and 0.9 mol of dimethylethanolamine) are then added to the reaction product at 60°C.–70°C., and the reaction is allowed to proceed to an NCO-value of virtually zero.

(B) Preparation Of Component B—In a reaction vessel provided with a stirrer, thermometer, dropping funnel and reflux condenser, 400 g of an epoxy resin based on bisphenol A (epoxide equivalent about 200) are dissolved in 172 g of
21g of diethanolamine are added at 60°C.–70°C. When the exothermic reaction has subsided, the reaction is allowed to proceed for one hour at about 130 °C. (reflux).

The reaction product is subsequently reacted at 70°C.–80°C. with 830 g of UMI (70% solution in MIBK of an unsaturated monoisocyanate, prepared from 1 mol of toluylene diisocyanate and 1 mol of hydroxyethyl methacrylate) to an NCO-value of virtually zero.

Preparation Of The Dispersion

The components A and B are thoroughly mixed at 70°C. in an 80/20 ratio, and the mixture is neutralized with 30 millimoles of formic acid per 100 g of solid resin. Most of the solvent MIBK is distilled off in vacuum at 80°C. The product is subsequently thinned with maximum stirring and at a falling temperature with deionized water to about 45%. The dispersion is carried out vigorously at this concentration for two hours with cooling, and the solids content is determined. The product is subsequently further thinned to 35% with deionized water.

This preparation of the binder dispersion corresponds to the preparation of Example 1 of AT-PS 353,369.

Preparation Of An Electrocoating Paint Composition

A bath material for electrocoating was prepared from the following formulation:

| | |
|---|---|
| 1600.0 | parts of 35% of binder dispersion |
| 2872.5 | parts of deionized water |
| 527.5 | parts of 53.3% pigment paste from above Example |
| 5000.0 | parts of paint |

The paint has a solids content of 16.8% and a pH of 6.0–6.2. The paint is homogenized by stirring for 25 hours and is then filtered through a weighed perlon sieve (mesh size 30 μm). The sieve residue is 8 mg per liter of bath material.

Zinc-phosphated steel panels were coated with the paint under the following bath conditions and thereafter stoved:

| | |
|---|---|
| Bath temperature | 28° C.–30° C. |
| Coating voltage | 300 V |
| Coating time | 2 minutes |
| Stoving conditions | 15 minutes/180° C. |
| Film thickness | 23–25 μm |

The films obtained, having a smooth surface, were tested for corrosion resistance by the VDA cycling test according to VDA test method 621–415. After 10 cycles, an undermigration of not more than 2 mm from the cross-cut occurred.

Deposition on a steel panel and bent at a right angle (L-panel test) gave a smooth surface even on a horizontal section of the panel (no pigment sedimentation). A repeat of the tests after an aging period of 3 weeks (at room temperature) gave virtually identical results.

As will be apparent to one skilled in the art, various modifications can be made within the scope of the aforesaid description. Such modifications being within the ability of one skilled in the art form a part of the present invention and are embraced by the appended claims.

IT IS CLAIMED:

1. Process for the preparation of pigment paste resins, for cathodically depositable coating compositions, comprising reacting:

(A) an epoxy resin carrying at least one free epoxide group and having a glass transition temperature between 10 C and 40°C., with (B) 50 to 100 mol %, based on the free epoxide groups in (A), of a primary-tertiary diamine, and, thereafter, (C) reacting the reaction product of (A) and (B) with 80 to 100 mol % of formaldehyde, based on the total of the primary amino groups of the amines used in (B) to form oxazolidine structures, (D) quaternized at least 20 mol % of the tertiary amino groups of the diamine (B) using an organic acid and a monoglycidyl compound in the presence of water, and (E) making up the amount of the acid used in (D) to 80-100 millimoles per 100 g of solid resin and adjusting the product with water to a predetermined application viscosity, with the proviso that the degree of quaternization is chosen in order that a solution of the product obtained in stage (D), containing 45% by weight of monoethylene glycol monobutyl ether and up to a maximum of 5% by weight of other organic solvents, is miscible at room temperature with water in any proportion to give a clear solution.

2. The process according to claim 1 wherein the free epoxide groups remaining after the reaction of (A) and (B) are reacted with a primary or secondary amine (B-1); and wherein the mol % of formaldehyde used is based on the total of the primary amino groups of the amines used in (B) and (B-1).

3. The process according to claim 1 wherein the primary-tertiary diamine of (B) is an N,N-dialkylaminoalkylamine.

4. The process according to claims 1 wherein said epoxy resin of (A) carries at least two epoxide groups and has a glass transition temperature between 20.C and 35.C.

5. The process according to claim 1, wherein the organic acid of step (D) is formic acid.

6. The process according to claim 1 wherein the epoxy resin of (A) is a bisphenol A-epichlorohydrin epoxy resin and an aliphatic diepoxy resin linked via aromatic and/or aliphatic bridging members.

7. The process according to claim 6 wherein a diphenol is used as the aromatic bridging member.

8. The process according to claim 7 wherein the diphenol is bisphenol A.

9. The process according to claim 6 wherein the reaction product of from 2 to 3 mol of monoglycidyl compound with 1 mol of a diprimary aliphatic diamine or triamine is used as the aliphatic bridging member.

10. The process according to claim 9 wherein said aliphatic monoglycidyl compound is a long-chain aliphatic monoglycidyl compound.

11. The process according to claim 1 wherein said epoxy resin is a bisphenol A-epichlorohydrin epoxy resin linked through (poly)disulphides.

12. The pigment paste resins made by the process of claim 1.

13. A pigment paste resin based on epoxy resin-amine adducts obtained from unmodified or modified epoxy resins, which by partial or complete reaction of secondary amino groups with formaldehyde contain oxazolidine structures; whose tertiary amino groups introduced via primary-tertiary diamines ar quaternized to at least 20 mol % using an organic acid and a monoglycidyl compound and which in a solution adjusted with water to a correct application viscosity contain a total of 80 to 100 millimoles of acid per 100 g of solid resin.

* * * * *